Patented Jan. 15, 1935

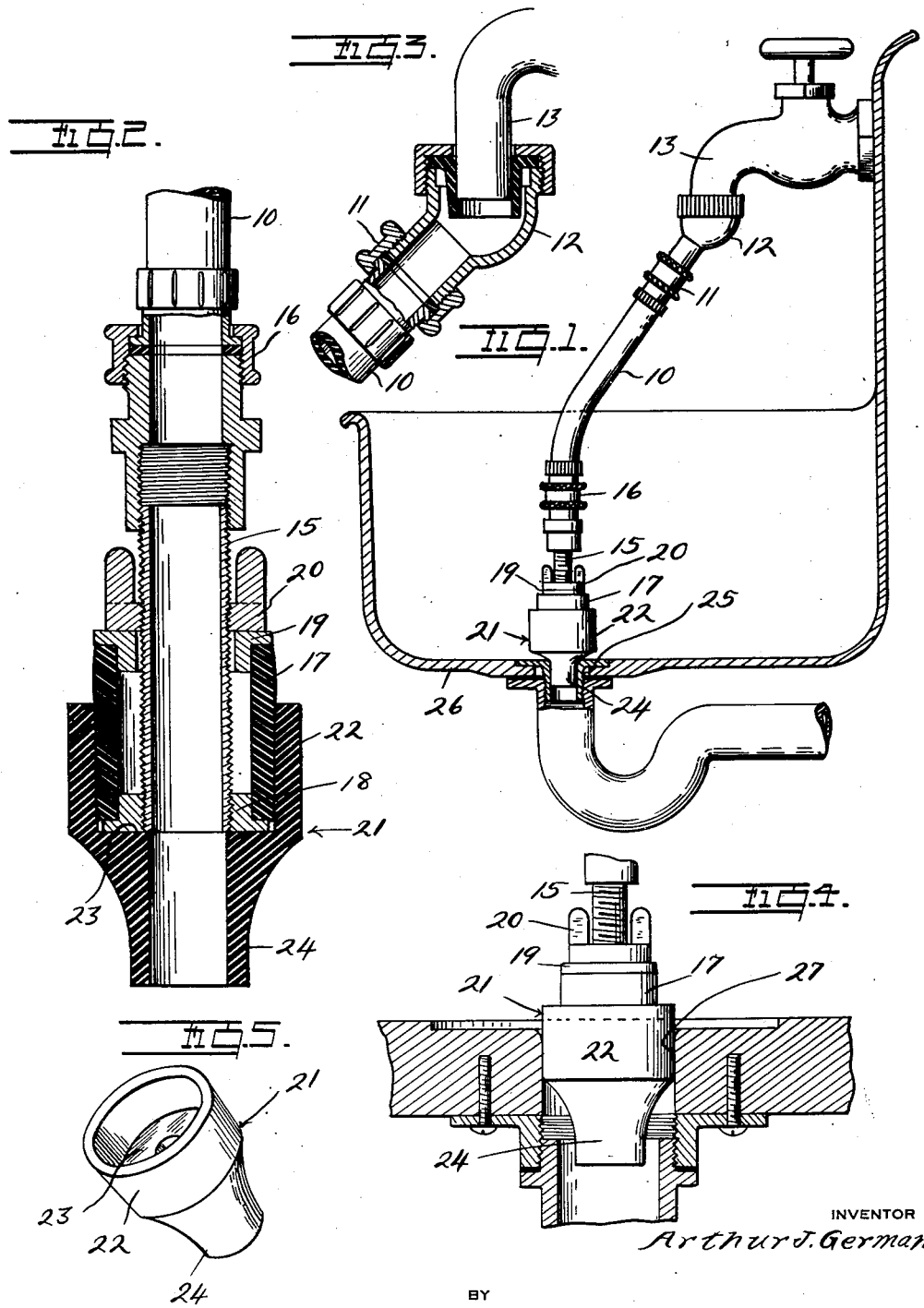

1,988,198

UNITED STATES PATENT OFFICE 1,988,198

PLUMBING FLUSHING DEVICE

Arthur J. German, Detroit, Mich., assignor to Alger R. Reno, River Rouge, Mich.

Application December 4, 1933, Serial No. 700,919

5 Claims. (Cl. 4—256)

This invention relates to plumbing flushing devices and has as one of its important objects to simplify devices of this character and render the same adaptable for use in connection with drain outlets of various sizes.

The present invention relates more particularly to a further improvement upon the type of plumbing flushing device shown and described in application Serial No. 682,028, filed July 24, 1933, which I filed jointly with Lloyd J. Sole.

The several objects, advantages and novel details of construction of this invention will be made more apparent as this description proceeds, especially when considered in connection with the accompanying drawing, wherein Figure 1 is an elevational view of the device as applied to a sink;

Figure 2 is an enlarged sectional view through the device at one end thereof;

Figure 3 is a sectional view through the end of the device which is attachable to a faucet;

Figure 4 is a sectional elevational view showing one end of the device in use in connection with a drain outlet of different size, and Figure 5 is a perspective view of the adapter.

The device comprises a flexible hose 10 which is connected by a coupling 11 to a fitting 12 adapted for attachment to a faucet mouth or other source of water under pressure. As shown more particularly in Figure 3, the faucet mouth 13 engages a rubber sleeve in the fitting 12 to provide a readily detachable connection with the faucet.

A second fitting 15 is connected to the other end of the flexible hose 10 by means of a coupling 16. This second fitting includes a flexible sleeve 17 which is held fixed at one end by means of a collar 18, the other end of the sleeve being engaged by a collar 19 adapted for axial movement of the fitting. The second collar is engaged by a thumb nut 20 threaded on the fitting so that the collar 19 may be forced towards the collar 18 to radially outwardly expand the sleeve 17 to cause the same to tightly engage a drain outlet if this fitting is inserted therein, or to engage a mating portion of an adapter when such an adapter is used.

It will be obvious that while the sleeve portion 17 of the device may be directly engaged in a drain outlet or similar plumbing opening, it will also be readily understood that in some instances plumbing openings may be encountered of a size which will not permit of the use of this fitting alone. Therefore, the present invention contemplates the employment of an adapter 21 formed preferably of rubber or some other similar flexible material. This adapter comprises a tubular or cylindrical portion 22 constituting a substantially cup-like section which may be engaged with the sleeve 17 of the fitting 15 in the manner probably best illustrated in Figure 2. The adapter is preferably formed at the inner end of the sleeve portion 22 with an annular shoulder 23 against which the end of the fitting 15 seats when the adapter is assembled therewith.

Extending from the cylindrical portion 22 of the adapter is a nipple portion 24 which is inwardly tapered toward the extremity thereof to form a substantially frusto-conical contour. It will be seen that the shape of the nipple is not truly frusto-conical because the nipple is preferably longitudinally bowed or curved inwardly.

With such an arrangement the tapered nipple portion 24 may for instance be engaged in the drain outlet 25 of the sink 26 in the manner illustrated in Figure 1, the nipple portion being forced down into the opening until further movement is limited by the engagement of the periphery of the drain opening with the tapered wall of the nipple. It will be obvious that with an opening of substantially the size of the drain opening 25 it would be impossible to insert the sleeve portion 17 of the fitting 15 therein and likewise the cylindrical portion 22 of the adapter would be of too large a diameter for insertion in such an opening.

However, as illustrated in Figure 4, a drain opening of the size such as illustrated at 27 might be encountered which would require a fitting of the size of the diameter of the cylindrical portion 22 of the adapter, in which event the device would be inserted into the drain opening substantially in the manner illustrated in Figure 4.

Thus it will be clearly understood that a plumbing flushing device of this character having an adapter such as herein illustrated and described may be, upon proper use of the adapter, rendered capable of use with drain openings of various sizes and types.

What I claim as my invention is:

1. A plumbing flushing device of the character described comprising, a flexible hose, a fitting on one end thereof for attachment to a faucet mouth, a second fitting on the other end of said hose having a flexible portion for attachment to a drain outlet, and an adapter detachably connected to the flexible portion of said second fitting, said adapter being formed of rubber or the like and comprising a cylindrical portion provided with an annular shoulder, and a frusto-conical nipple portion extending from said cylindrical portion, said second fitting being telescoped within said cylindrical portion and engaging said shoulder.

2. A plumbing flushing device of the character described comprising, a flexible hose, a fitting on one end thereof for attachment to a faucet mouth, a second fitting on the other end of said hose capable of being varied in size, and an adapter engaging said second fitting and capable of expanding therewith as and for the purpose set forth.

3. A plumbing flushing device of the character described comprising, a flexible hose, a fitting on one end thereof for attachment to a faucet mouth, a second fitting on the other end of said hose for attachment to a drain outlet, said second fitting having a flexible portion, means for expanding said flexible portion, and an adapter engaging said flexible portion and capable of being expanded with the flexible portion of said fitting as and for the purpose set forth.

4. A plumbing flushing device of the character described comprising, a flexible hose, a fitting on one end thereof for attachment to a faucet mouth, a second fitting on the other end of said hose for attachment to a drain outlet, said second fitting comprising a flexible sleeve, means for expanding said flexible sleeve, and an adapter telescopically engaging said flexible sleeve for use in connection with drain outlets of other sizes and types, said means operable to expand said flexible sleeve and adapter as and for the purpose set forth.

5. A plumbing flushing device of the character described comprising, a flexible hose, a fitting on one end thereof for attachment to a faucet mouth, a second fitting on the other end of said hose having a flexible portion insertable into a drain outlet, means for expanding said flexible portion, and a rubber adapter comprising a cylindrical portion provided with an annular shoulder and a frusto-conical nipple portion extending from said cylindrical portion, said flexible portion of said second fitting being telescoped within said cylindrical portion and engaging said annular shoulder for expanding the adapter upon expanding of the flexible portion as and for the purpose set forth.

ARTHUR J. GERMAN.

CERTIFICATE OF CORRECTION.

Patent No. 1,988,198. January 15, 1935.

ARTHUR J. GERMAN.

It is hereby certified that the above numbered patent was erroneously issued to "Alger R. Reno" as assignee of the entire interest in said invention whereas said patent should have been issued to the inventor said "German" and Alger R. Reno, as assignee of one-half interest only as shown by the records of assignments in this office; and that the said Letters Patent should be read with this correction therein that the same may conform to the record of the case in the Patent Office.

Signed and sealed this 5th day of March, A. D. 1935.

(Seal)

Leslie Frazer
Acting Commissioner of Patents.